United States Patent

Katayama

[11] Patent Number: 5,251,138
[45] Date of Patent: Oct. 5, 1993

[54] CRUISE CONTROL APPARATUS FOR A VEHICLE

[75] Inventor: Kazuyori Katayama, Himeji, Japan

[73] Assignee: Mitsubishi Denki Kabushiki Kaisha, Tokyo, Japan

[21] Appl. No.: 789,664

[22] Filed: Nov. 8, 1991

[30] Foreign Application Priority Data

Nov. 9, 1990 [JP] Japan .................. 2-302778

[51] Int. Cl.$^5$ .............................................. B60K 41/18
[52] U.S. Cl. ........................ 364/426.04; 364/431.07; 364/424.1; 180/179
[58] Field of Search .................. 364/426.04, 431.07, 364/424.1; 123/352; 180/170, 177, 179

[56] References Cited

U.S. PATENT DOCUMENTS

| | | | |
|---|---|---|---|
| 4,938,604 | 7/1990 | Naito et al. | 364/426.04 |
| 4,939,657 | 7/1990 | Imai et al. | 364/426.04 |
| 4,982,805 | 1/1991 | Naitou et al. | 180/179 |
| 5,010,490 | 4/1991 | Naitou et al. | 364/431.07 |
| 5,085,286 | 2/1992 | Danzaki et al. | 364/426.04 |

*Primary Examiner*—Gary Chin
*Attorney, Agent, or Firm*—Sughrue, Mion, Zinn, Macpeak and Seas

[57] ABSTRACT

A cruise control apparatus for a vehicle includes an automatic transmission with a predetermined gear shift characteristic for automatically shifting a gear ratio based on a relationship between the speed of the vehicle and the opening degree of a throttle valve. The apparatus is able to prevent an unwanted gear shift in the automatic transmission during cruise control without requiring a throttle sensor output indicative of the opening degree of a throttle valve. A vehicle speed sensor senses the actual speed of the vehicle and generates a corresponding output signal. A cruise control instructor generates an instruction signal for instructing a specific one among various cruise control modes. A cruise controller performs cruise control on the vehicle based on the actual vehicle speed as sensed by a vehicle speed sensor and the output signal from the cruise control instructor. An actuator is operatively connected with the throttle valve for driving it in accordance with the output signal from the cruise controller. An actuator-displacement detector is responsive to the output signals from the cruise control instructor and the cruise controller for successively detecting a displacement of the actuator. The detector compares the thus detected displacement of the actuator with a predetermined threshold value for the current gear ratio of the transmission, generate an output signal as a result of the comparison and supply it to the cruise controller, whereby the cruise controller controls the displacement of the actuator so as not to cause a gear shift in the transmission.

5 Claims, 6 Drawing Sheets

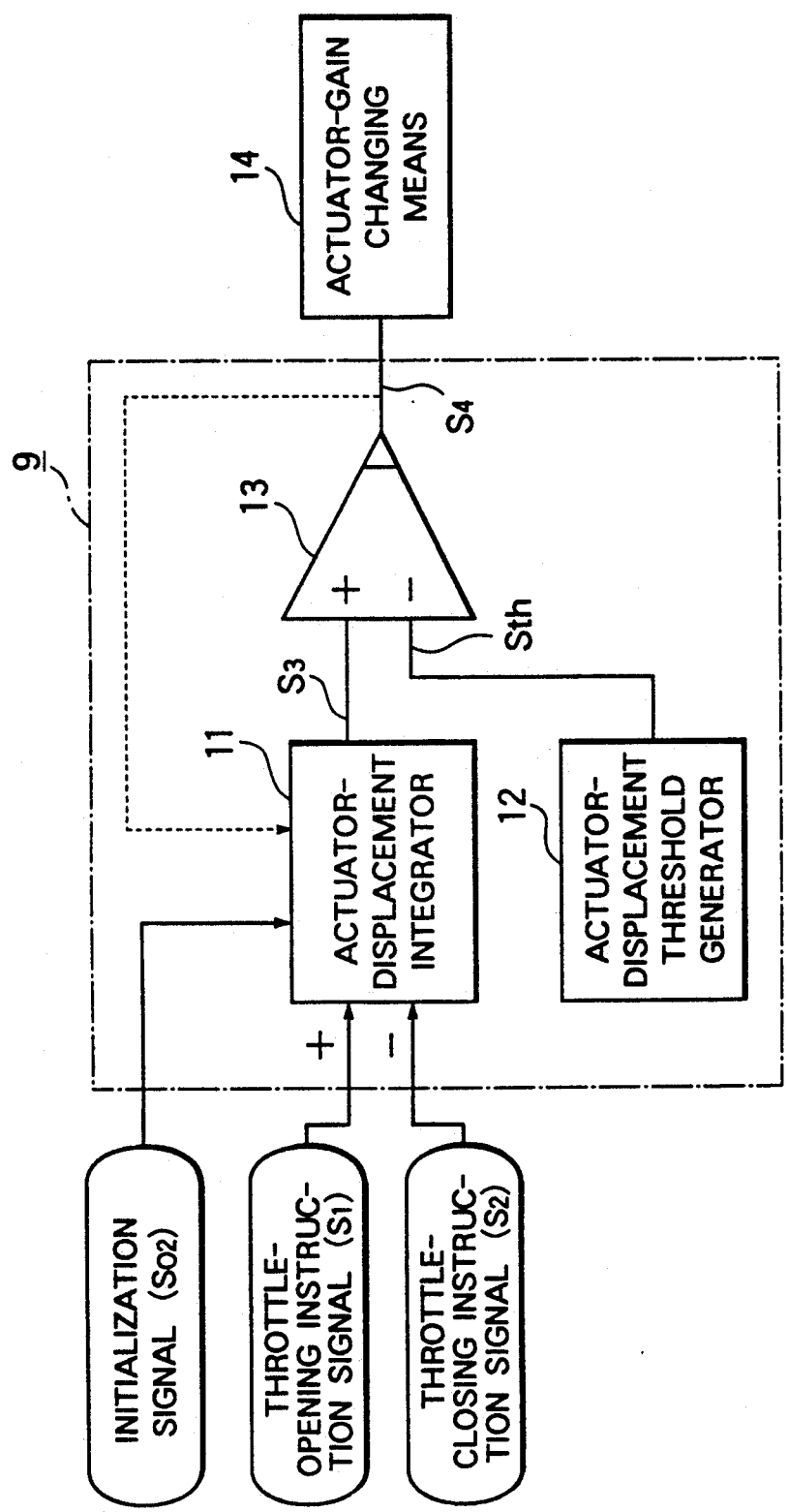

CRUISE CONTROL APPARATUS FOR A VEHICLE

BACKGROUND OF THE INVENTION

The present invention relates to a cruise control apparatus for a vehicle for automatically maintaining the speed of the vehicle at a target level.

There has hitherto been known a cruise control apparatus for a vehicle in which the opening degree of a throttle valve disposed in an intake manifold of an internal combustion engine is controlled by an actuator on the basis of the speed of the vehicle as sensed by a speed sensor and a target speed. A cruise controller calculates a control quantity for the actuator whereby the actuator is driven to adjust the opening degree of the throttle valve to make the vehicle speed equal to the target speed. Such an actuator comprises a motorized actuator having a DC motor as its drive source which is able to move the throttle valve to its fully open and closed positions. With the use of such a motorized actuator, the gear ratio of an automatic transmission is changed automatically on the basis of the relation between the vehicle speed and the opening degree of the throttle valve such as when the vehicle ascends a steep slope. In this case, in the event that a gear shift is effected with the throttle valve being at a relatively large degree of opening, a great change in the engine output torque will take place, giving rise to a substantial shock to the vehicle. This causes an unpleasant sensation to the driver and passengers in the vehicle. In extreme cases, the vehicle can be subject to a sudden acceleration, thus arousing a fear of runaway of the vehicle in the driver and passengers. To cope with such a situation, the control output of the actuator is limited such as by the output signal of a potentiometer which senses the opening degree of the throttle valve. This will be described below in more detail with reference to FIG. 5.

FIG. 5 illustrates an typical example of this type of conventional cruise control apparatus for a vehicle which is disclosed in Japanese KoKai No. 58-39311. The apparatus illustrated includes a plurality of cruise control switches such as a set switch 101 for setting in or starting cruise control, and a cancellation switch 102 which is automatically operated upon application of the brakes of the vehicle to cancel cruise control. A speed sensor 103 for sensing the speed of the vehicle comprises a rotary member 103a having four magnetic poles disposed at equal circumferential intervals with respect to each other and being connected to an unillustrated transmission through an unillustrated cable for synchronized rotation with an output shaft of the transmission, and a reed switch 103b disposed adjacent the rotary member 103a and having a pair of contacts one of which is connected to ground and the other of which is connected to a control unit 106. The reed switch 103b of the speed sensor 103 is magnetically switched on or off every time each one of the four magnetic poles of the rotary member 103a passes near its contacts of the reed switch 103b, generating a pulsating signal comprising a train of pulses having a frequency proportional to the speed of the vehicle. The control unit 106 including a calculator 106a in the form of a microcomputer is connected through a main or power switch 105 to a power supply 104 in the form of a battery mounted on the vehicle. The control unit 106 receives the output signals from the set switch 101, the cancellation switch 102 and the speed sensor 103, and it operates to perform various calculations and processing for automatic cruise control whereby the speed Vs of the vehicle is made to match the target speed Vr. Based on these calculations and processing, the control unit 106 generates various control outputs for doing such automatic control which is fed to a throttle actuator 107 in the form of a motorized actuator. The throttle actuator 107 is operatively connected, through a link mechanism comprising a link 107a in the form of a rotary disk and a wire 107b, with a throttle valve 109 which is disposed in an intake manifold 108 of the internal combustion engine for controlling the amount or flow rate of intake air sucked into the engine through the intake manifold 108. The throttle valve 109 is also operatively connected with an unillustrated accelerator pedal through the link mechanism. The link or disk 107a rotates around its axis in correspondence with the rotational motion of the throttle valve 109 so that the rotational angle of the disk 107a corresponding to the opening degree of the throttle valve 109 is sensed by an unillustrated potentiometer incorporated in the actuator 107 and it is sent to the control unit 106 as a throttle signal. The disk-shaped link 107a is connected with the actuator motor through an unillustrated electromagnetic clutch which is controlled by the control unit 106.

The operation of the above-mentioned conventional cruise control apparatus will now be described in detail below. First, when the driver turns on the main or power switch 105, electric power is supplied from the battery 104 to the control unit 106 which is thus energized to process the output signal from the speed sensor 103. During the time the vehicle is travelling, the speed sensor 103 generates a pulsating signal containing a train of pulses having a frequency proportional to the vehicle speed Vs. The periods of successive pulses from the speed sensor 103 are measured by the control unit 106 to calculate the vehicle speed Vs. When the driver switches the set switch 101 on, a set signal is supplied to the control unit 106 which is thereby operated to start cruise control so that the vehicle speed Vs at that time is stored therein as a target speed Vr.

Thereafter, the control unit 106 compares the vehicle speed Vs successively sensed by the speed sensor 103 with the target speed Vr and generates a control signal to the throttle actuator 107 which is thereby driven to control the opening degree of the throttle valve 109 in such a manner as to match the vehicle speed Vs with the target speed Vr. More specifically, in cases where the actual vehicle speed Vs is less than the target speed Vr, the control unit 106 generates a throttle opening signal for driving the throttle valve 109 in an opening direction by an appropriate amount. On the contrary, if the actual vehicle speed Vs is greater than the target speed Vr, the control unit 106 generates a throttle closing signal for moving the throttle valve 109 in a closing direction by an appropriate amount. In this manner, the vehicle is controlled to travel at the constant target speed Vr without requiring any driver's accelerator pedal operation. On the other hand, if the driver applies the brakes during cruise control, the cancellation switch 102 is automatically operated to generate a cancellation signal to the control unit 106 which then immediately outputs a clutch release signal to the throttle actuator 107 to release or disengage the built-in electromagnetic clutch. As a result, the driver is able to freely control the throttle valve 109 through the accelerator pedal at his or her own will, so that the speed of the vehicle is accordingly controlled manually by the driver.

As can be seen from the foregoing description, with the conventional cruise control apparatus, for the purpose of driving the actuator 107 while avoiding an automatic gear shift by the automatic transmission apparatus on the basis of the relation between the vehicle speed and the opening degree of the throttle valve 109 during cruise control, the actuator 107 is required to have a built-in potentiometer or the like for sensing the throttle opening, or it is necessary to sense the output signal from a throttle sensor which senses the opening degree of the throttle valve 109. In addition, the provision of electrical elements such as a potentiometer or the like built in the actuator 107 needs electrical circuits incorporated in the actuator 107, thus resulting in a complicated construction and high costs of manufacture. Moreover, the actuator 107 is generally accomodated in an engine compartment of a vehicle. In this case, in order to protect the electrical elements and circuits incorporated in the actuator 107 against intrusion of moisture, rain water, external dust and the like, special considerations or measures should be taken into account. Further, the potentiometer for sensing the throttle opening generally transmits to the control unit 106 its output signal in the form of an analog signal, which is required to be converted into digital form suitable for processing by the microcomputer 106a in the control unit 106. This results in a complicated circuit design or arrangement.

SUMMARY OF THE INVENTION

Accordingly, the present invention is aimed at overcoming the above-noted problems encountered with the conventional cruise control apparatus.

An object of the invention is to provide a novel and improved cruise control apparatus for a vehicle which is able to prevent an unwanted gear shift in an automatic transmission during cruise control without requiring a throttle sensor output.

In order to achieve the above object, according to the present invention, there is provided cruise control apparatus for a vehicle having an automatic transmission with a predetermined gear shift characteristic in which a gear ratio of the transmission is automatically shifted on the basis of a relationship between the speed of the vehicle and the opening degree of a throttle valve. The apparatus comprises: vehicle speed sensing means for sensing the actual speed of the vehicle and generating a corresponding output signal; cruise control instruction means for generating an instruction signal for instructing a specific one among various cruise control modes; cruise controller for performing a cruise control on the vehicle based on the output signal from the vehicle speed sensing means and the output signal from the cruise control instruction means; an actuator operatively connected with the throttle valve for driving it in accordance with the output signal from the cruise controller; and an actuator-displacement detector responsive to the output signals from the cruise control instruction means and the cruise controller for successively detecting a displacement of the actuator, the detector being operable to compare the thus detected displacement of the actuator with a predetermined threshold value for the current gear ratio of the transmission, generate an output signal as a result of the comparison and supply it to the cruise controller, whereby the cruise controller controls the displacement of the actuator so as not to cause a gear shift in the transmission.

Preferably, the actuator-displacement detector comprises: an actuator-displacement integrator which receives the output signals from the cruise control instruction means and the cruise controller, successively integrates the displacement of the actuator, and generates a corresponding output signal; an actuator-displacement threshold generator for generating a threshold for the displacement of the actuator; and a comparator for comparing the integrated output of the integrator with the threshold output from the actuator-displacement threshold generator and generating an output representative of the result of the comparison.

The threshold generated by the actuator-displacement threshold generator is less than a predetermined value which corresponds to a critical opening degree of the throttle valve at which a gear shift in the transmission takes place at the vehicle speed as sensed.

An actuator-gain change means is provided for changing a control gain of the actuator based on the output from the comparator.

The actuator-gain change means maintains the actuator control gain unchanged if the integrated output of the integrator is less than the threshold, whereas it reduces the actuator control gain if the integrated output of the integrator is equal to or greater than the threshold.

The above and other objects, features and advantages of the invention will become more readily apparent from the following detailed description of a preferred embodiment of the invention taken in conjunction with the accompanying drawings.

BRIEF DESCRIPTION OF THE DRAWINGS

FIG. 2 is a block diagram of an essential portion of the apparatus of FIG. 1;

DESCRIPTION OF THE PREFERRED EMBODIMENT

A preferred embodiment of the invention will now be described in detail with reference to the accompanying drawings.

Figure 1:
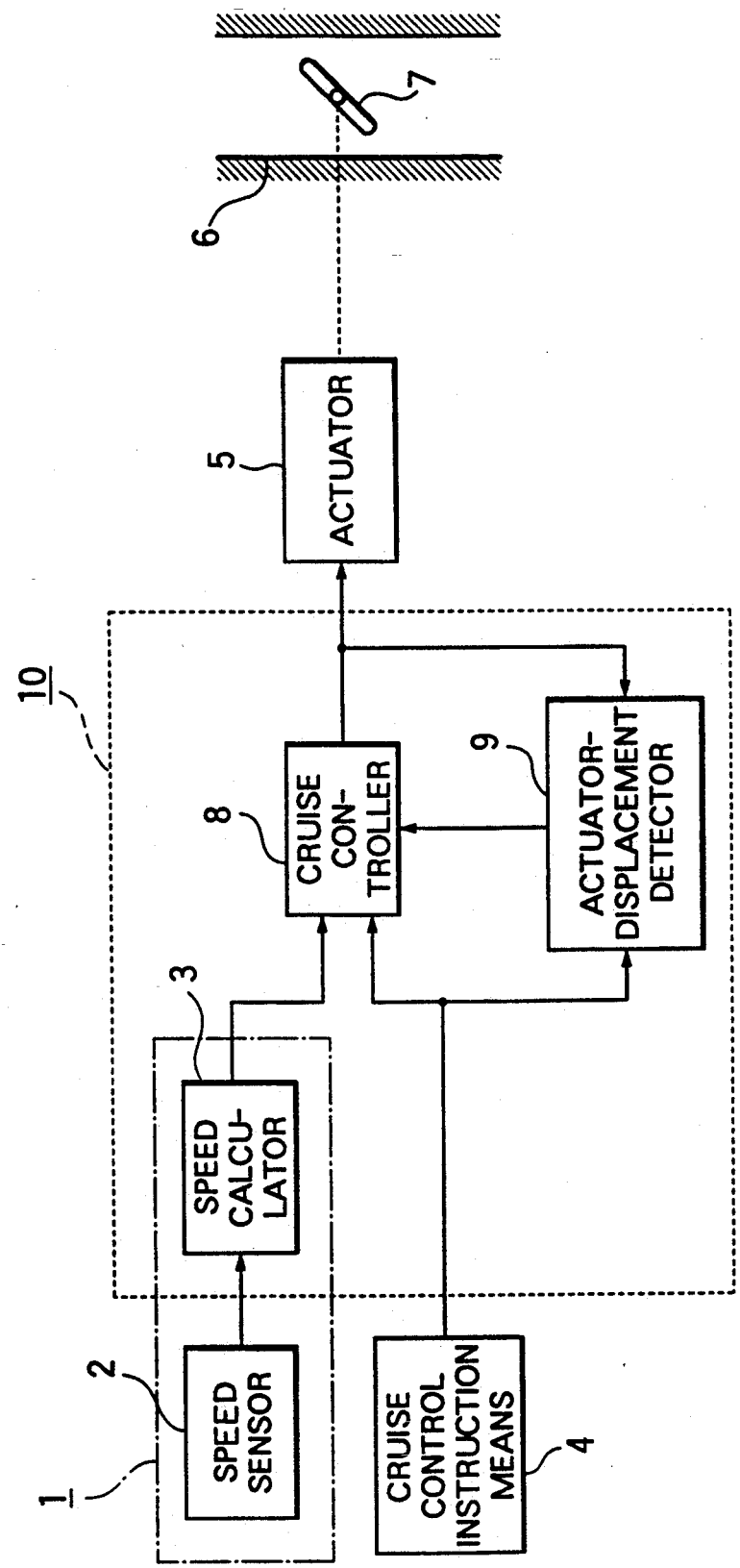
FIG. 1 is a block diagram showing the general arrangement of a cruise control apparatus for a vehicle in accordance with the present invention.

Referring to the drawings and first to FIG. 1, there is schematically illustrated a cruise control apparatus for a vehicle constructed in accordance with the principles of the invention. In this figure, a speed sensing means 1 for sensing the actual speed of a vehicle comprises a signal generator 2 for generating a pulsating signal containing a train of pulses having a frequency corresponding to the vehicle speed, and a speed calculator 3 for calculating the actual speed of the vehicle based on the period of two successive pulses from the signal generator 2, as is well known in the art. A cruise control instruction means 4 generates an instruction signal for performing a specific mode of cruise control among various cruise control modes such as, for example, setting of cruise control, cancellation of cruise control, and the like. An actuator 5 including a DC motor as its drive source controllably drives a throttle valve 7 in an opening or closing direction, which is disposed in an intake manifold 6 of an internal combustion engine (not shown) of a vehicle. A cruise controller 8 for controlling the actuator 5 receives the output signals from the speed sensing means 1, the cruise control instruction means 4 and a later-mentioned actuator-displacement or motion detector 9, performs various calculations and processing for cruise control based on these signals, and outputs to the actuator 5 a control signal to control the opening degree of the throttle valve 7 in a manner such that the actual speed of the vehicle is made equal to the target speed.

FIG. 2 shows the detailed arrangement of the actuator-displacement or motion detector 9, which will be described below. In FIG. 2, the actuator-displacement detector 9 receives the control output from the cruise control means 8 and the output signal from the cruise control instructing means 4, senses the quantity of motion or stroke of the actuator 5, makes a comparison between the moved stroke or length of the actuator 5 and a threshold value which corresponds, for example, to 80% of a critical value for a gear shift of an automatic transmission, as shown by a gear shift characteristic curve of FIG. 6, and generates an output signal based on the result of the comparison to the cruise control means 8. In this regard, the speed calculator 3, the cruise controller 8 and the actuator-motion detector 9 can be formed by a microcomputer 10 which, through not shown, may further include an input and output interface, a central processing unit (CPU), a ROM storing a control program as shown by the flow charts of FIGS. 3(a) through 3(c), a RAM and the like.

Figure 6:
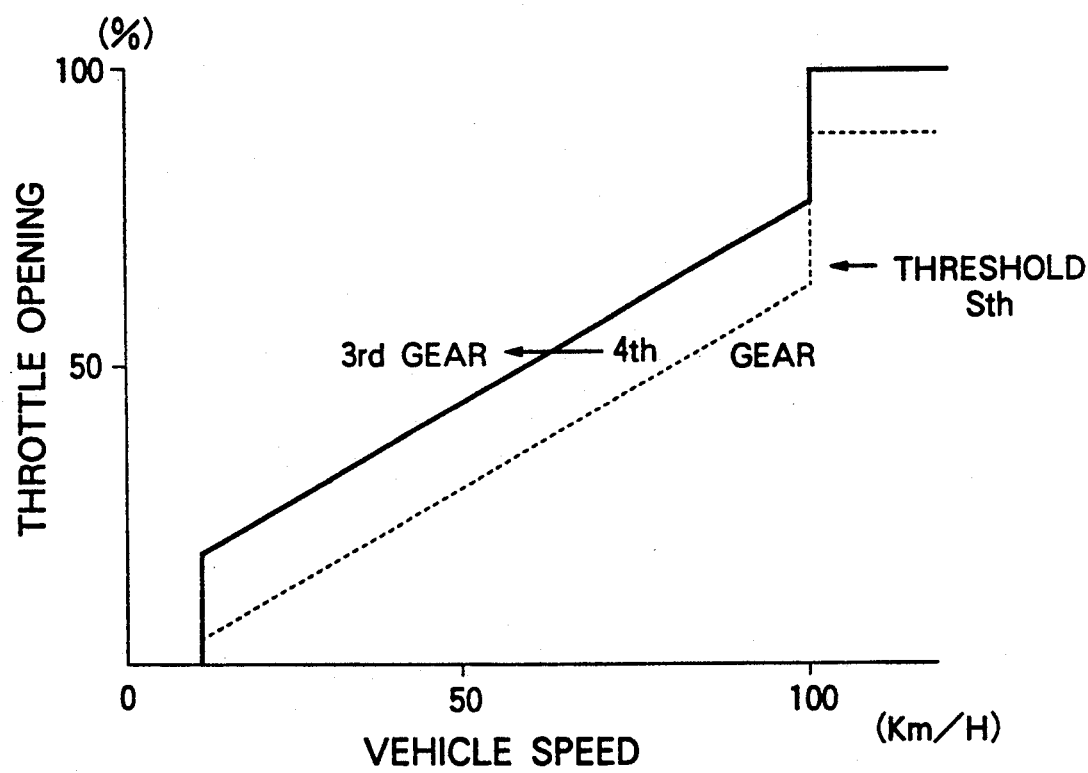
FIG. 6 is a graphical representation showing a gear shift characteristic of an automatic transmission as commonly employed in the cruise control apparatuses of FIGS. 1 and 5.

As shown in FIG. 2, the actuator-displacement or motion detector 9 comprises an actuator-displacement integrator 11 for integrating the control output of the cruise controller 8 indicative of the quantity of displacement or movement of the actuator 5, an actuator-displacement threshold generator 12 for generating a threshold for actuator motion which, for example, corresponds to about 80% of a critical value for gear shift as represented by the gear shift characteristic curve of the automatic transmission of FIG. 6, and a comparator 13 for comparing the output from the actuator-displacement integrator 11 with the threshold generated by the actuator-displacement threshold generator 12 and generating an output signal representative of the result of the comparison thus made. An actuator gain controller 14, which is part of the cruise controller 8, variably sets the gain of the control output to be supplied to the actuator 5 based upon the output of the comparator 13.

Next, the operation of the above embodiment will be described in detail while referring to FIGS. 1 and 2. When the vehicle is travelling, the speed sensor 2 generates a pulsating signal containing a train of pulses having a frequency corresponding to the speed of the vehicle. Based on the periods of successive pulses contained in the output signal from the speed sensor 2, the speed calculator 3 calculates the actual speed of the vehicle Vs in a well-known manner, which is then input to the cruise controller 8. When a reset signal $S_{01}$ is generated by the cruise control instruction means 4, the cruise controller 8 sets the vehicle speed Vs sensed at that instant by the speed sensor 2 as a target speed Vr. Thereafter, on the basis of the vehicle speed Vs as successively sensed and the target speed Vr thus set, the cruise controller 8 calculates a control quantity for the actuator 5 and sends a control signal representative of the thus calculated control quantity to the actuator 5 which is thereby controlled to drive the throttle valve 7 in an opening or closing direction for adjusting the output torque of the engine.

On the other hand, the control output of the cruise controller 8 is input to the actuator-displacement integrator 11 in the actuator-displacement detector 9 as a throttle opening instruction signal $S_1$ or a throttle closing instruction signal $S_2$, and it is integrated therein in a positive (+) or negative (−) sense depending on whether the cruise controller output is the throttle opening instruction signal $S_1$ or the throttle closing instruction signal $S_2$, respectively. The integrated output $S_3$ of the integrator 11 is then fed to the comparator 13 where it is compared with the threshold $S_{th}$ from the actuator-displacement threshold generator 12, which, for example, corresponds to 80% of a critical value for gear shifting at which the gear ratio of the transmission changes from a higher ratio (e.g., the fourth gear) into a lower ratio (e.g., the third gear) or vise versa, as depicted in FIG. 6. If the integrated value $S_3$ is equal to or greater than the threshold $S_{th}$, the comparator 13 outputs a gain change signal $S_4$ of a high level "1", whereas if not (i.e., $S_3 < S_{th}$), it generates an output signal $S_4$ of a low level "0". If the actuator-gain change means 14 receives the gain change signal $S_4$ of the high level "1" from the comparator 13, it changes the actuator gain K from "1" to a lesser value such as $\frac{1}{2}$ for example, whereas if the gain change signal $S_4$ is at the low level "0", the actuator gain K remains unchanged and is held at "1". Based on the gain K thus determined, the cruise controller 8 decides on an appropriate control output which is supplied to the actuator 5 and fed back to the actuator-displacement detector 9. In this connection, upon receipt of an initialization signal such as a cancellation signal $S_{02}$ from the cruise control instruction means 4, the actuator-displacement integrator 11 sets its output $S_3$ to "0" and then locks it at that value in order to prevent it from being made to a negative value.

The operation of the microcomputer 10 as shown in FIG. 1 will now be described below with particular reference to FIGS. 3(a) through 3(c). First in Step 20 in FIG. 3(a), an initial or target speed is set, and in Step 30, a cruise control routine is carried out. In Step 40, an actuator-displacement calculation routine is carried out and then a return is performed to Step 30.

Figure 3A:
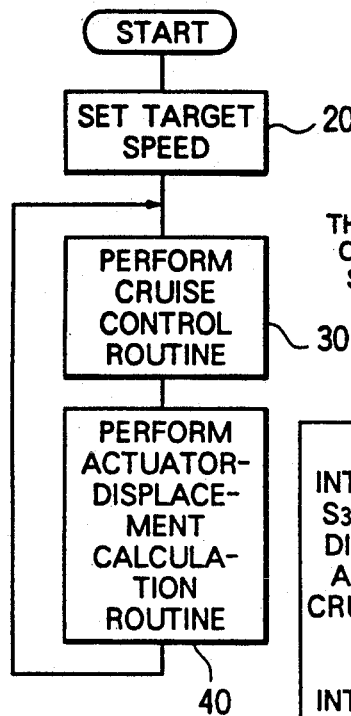
FIG. 3(a) is a flow chart showing a main routine of a control program executed by a microcomputer of FIG. 1.
Figure 3B:
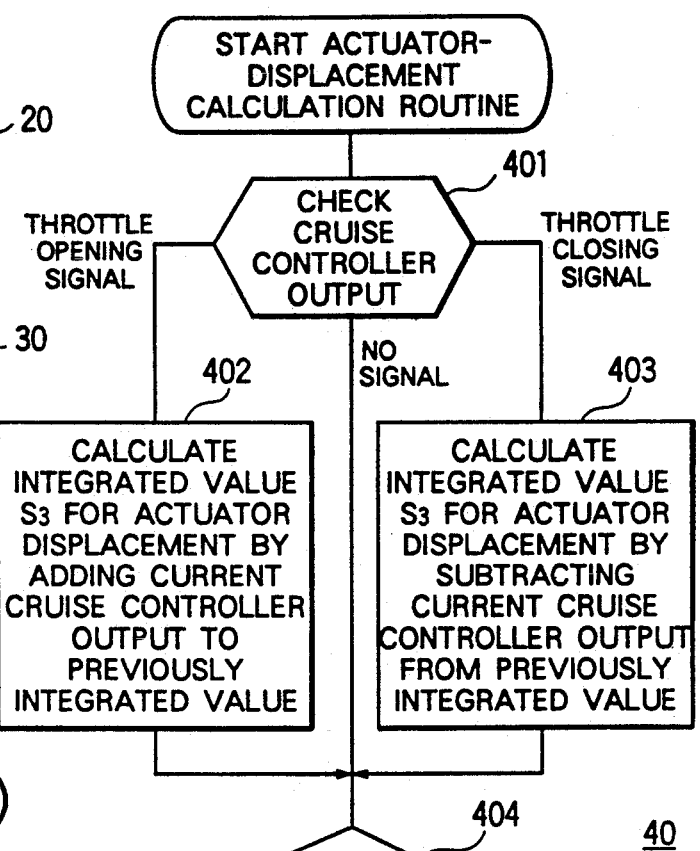
FIG. 3(b) is a flow chart showing the details of an actuator-displacement calculation routine carried out in the main routine of FIG. 3(a)

The actuator-displacement calculation routine is carried out in the following manner as shown in FIG. 3(b). First in Step 401, the kind of the control output from the cruise controller 8 is checked or it is determined whether the cruise controller output is a throttle opening instruction signal $S_1$ or a throttle closing instruction signal $S_2$. If it is a throttle opening instruction signal $S_1$, then the program goes to Step 402 where the integrated value $S_3$ previously calculated is added by the current output from the cruise controller 8 to provide an updated value. If, however, it is a throttle closing instruction signal $S_2$, then the program goes to Step 403 where the integrated value $S_3$ previously obtained is subtracted by the current cruise controller output to provide an updated value. If the determination in Step 401 is made otherwise, the previously integrated value $S_3$ remains unchanged and is held as an updated value, and then the program goes to Step 404. Also, after Steps 402 and 403, the program goes to Step 404 where it is determined whether the integrated value $S_3$ thus updated is less than a lower limit "0 (zero)". If the answer is "YES", then the program goes to Step 405, whereas if the answer is "NO", the program goes to Step 406. Also, in Step 404, it is further determined whether there is an initialization signal such as a cruise control cancellation signal generated. If the answer to this question is "YES", then the program goes to Step 405, whereas if the answer is "NO", the program goes to Step 406. In Step 405, the integrated value $S_3$ is set to zero. Then in Step 406, it is determined whether the integrated value $S_3$ is equal to or greater than the threshold value $S_{th}$. If $S_3 \geq S_{th}$, then in Step 407, a gain change flag "1" is set up, but if $S_3 < S_{th}$, then in Step 408, the gain change flag is reset.

Figure 3C:
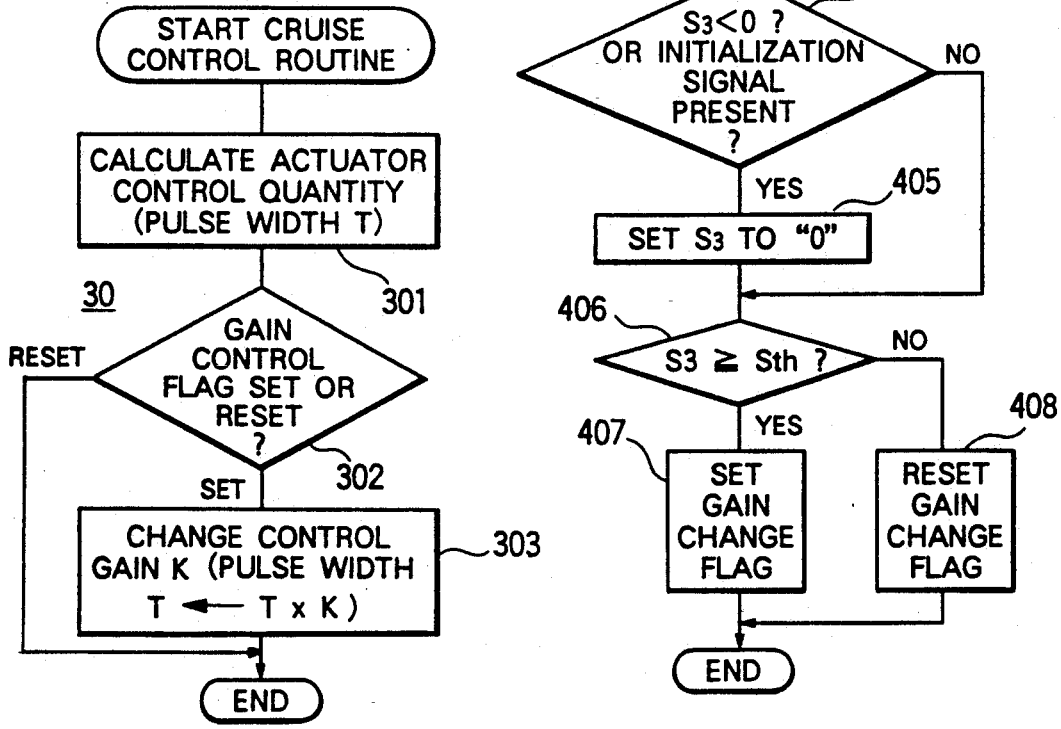
FIG. 3(c) is a flow chart showing the details of a cruise control routine carried out in the main routine of FIG. 3(a)

FIG. 3(c) shows the details of the cruise control routine as performed in Step 30 in FIG. 3(a). In this figure, first in Step 301, on the basis of the actual vehicle speed Vr and the target speed Vr, a control quantity for the actuator 5 and a corresponding pulse width T of a drive pulse for driving the actuator 5 are calculated. In Step 302, it is determined whether a gain change flag is set or reset. If it is set, then in Step 303, the control gain K (which is normally "1") is changed to a lesser value such as ½ for example, and the pulse width T as obtained in Step 301 is multiplied by the thus changed control gain K to provide an updated pulse width. If it is reset, however, the control gain K (=1) remains unchanged, so the pulse width T as calculated in Step 301 is held unaltered and used as an updated value. The thus updated pulse width T is then fed as an actuator instruction or control signal to the actuator 5 and the actuator-displacement detector 9.

Figure 4:
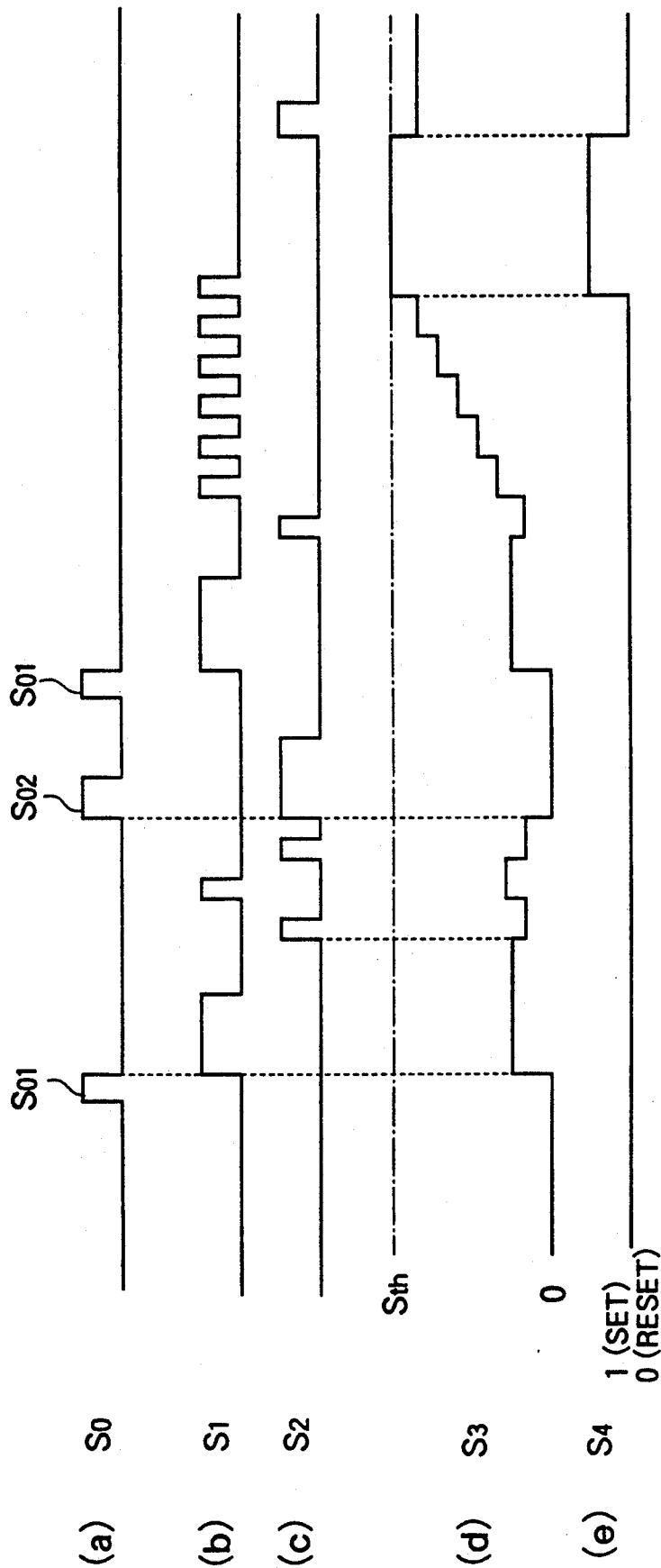
FIG. 4 is a waveform diagram showing the waveforms of signals at various portions of the apparatus of FIG. 1.
Figure 5:
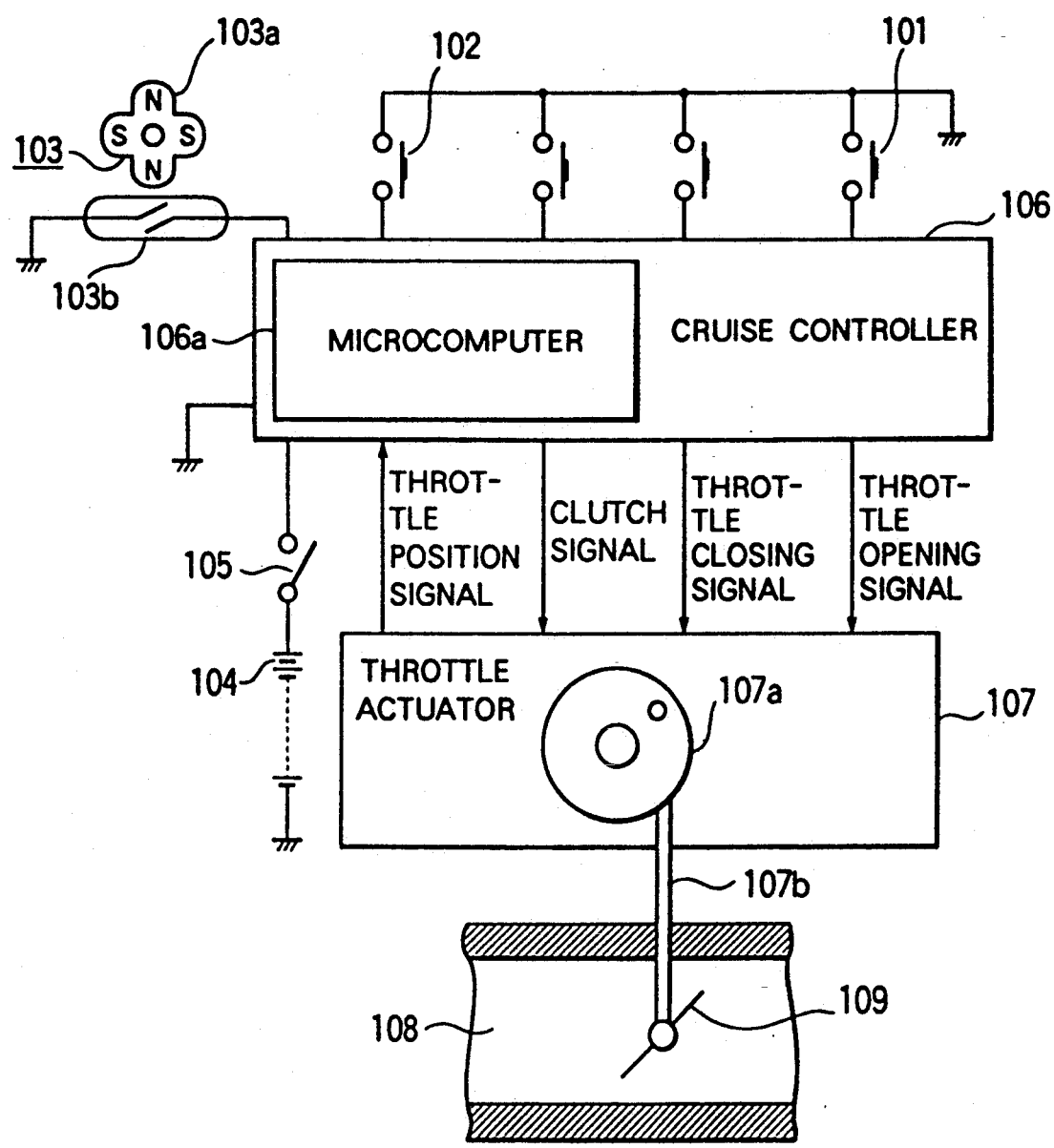
FIG. 5 is a block diagram showing the general arrangement of a conventional cruise control apparatus.

FIG. 4 shows the operational timing of various signals associated with the above-described operations. In FIG. 4, (a) shows the waveforms of a set signal $S_{01}$ and a reset signal $S_{02}$ output from the cruise control instruction means 4; (b) shows the waveform of a throttle opening instruction signal $S_1$; (c) shows the waveform of a throttle closing instruction signal $S_2$; (d) shows the waveform of the output signal $S_3$ of the actuator-displacement integrator 11; and (e) shows the waveform of the gain change signal $S_4$.

Although in the above embodiment, the actuator-displacement threshold is set to about 80% of a critical value for gear shift, as expressed by the gear shift characteristic curve of the automatic transmission of FIG. 6, it may be set to any other value less than 100% thereof, whereby the displacement of the actuator 5 becomes or is limited within a predetermined range of the gear shift characteristic of the automatic transmission in which there is no gear shift.

In addition, although in the above embodiment, the control gain K is changeable between 1 and ½, it can be changed from 1 to any other lesser value. For example, the control gain K can be set such that the displacement of the actuator 5 is limited within a range in which there takes place no gear shift in the automatic transmission.

The above embodiment has been described with the actuator in the form of a motorized actuator utilizing a DC motor for its drive source. However, the actuator may be constructed otherwise while providing substantially the same effects. For example, it may comprise a vacuum-operated actuator which is operated by an electrically operated vacuum pump under the control of a solenoid valve, or it can be a vacuum-operated actuator which is operated by a vacuum source provided independently of the intake vacuum in an intake manifold of an engine for controlling the throttle valve.

Moreover, between Steps 406 and 407 of FIG. 3(b), an additional Step can be provided for making the integrated value $S_3$ equal to the threshold value $S_{th}$. In this case, the output signal of the comparator 13 should be fed back to the actuator-displacement integrator 11, as indicated by a broken line in FIG. 2, so that the integrated value $S_3$ is made equal to the threshold $S_{th}$ by means of the integrator 11 if $S_3 \geq S_{th}$.

What is claimed is:

1. A cruise control apparatus for a vehicle having an automatic transmission with a predetermined gear shift characteristic in which a gear ratio is automatically shifted on the basis of a relationship between the speed of the vehicle and the opening degree of a throttle valve (7), said apparatus comprising:

vehicle speed sensing means (2, 3) for sensing the actual speed of the vehicle and generating a corresponding output signal;

cruise control instruction means (4) for generating an instruction signal for instructing a specific one of various cruise control modes;

a cruise controller (8) for performing cruise control on the vehicle based on the output signal from said vehicle speed sensing means and the instruction signal from said cruise control instruction means;

an actuator (5) operatively connected with the throttle valve for driving said valve in accordance with an output signal from said cruise controller; and an actuator-displacement detector (9) responsive to the instruction signal from said cruise control instruction means and the output signal from said cruise controller for successively detecting a displacement of said actuator, said detector being operable to:
   a) compare the thus detected displacement ($S_3$) of said actuator with a threshold value ($S_{th}$) for a current gear ratio of the transmission, said threshold value being less than a predetermined value which corresponds to a critical opening degree of the throttle valve at which a gear shift in the transmission takes place at the sensed vehicle speed,
   b) generate a comparison output signal ($S_4$) when the detected displacement of said actuator is equal to or greater than said threshold value, and
   c) supply the comparison output signal to said cruise controller such that the displacement of said actuator and attendantly the driving of the throttle valve does not cause a gear shift in the transmission.

2. A cruise control apparatus according to claim 1, wherein said actuator-displacement detector comprises:
   an actuator-displacement integrator (11) which receives the output signals from said cruise control instruction means and said cruise controller, successively integrates the displacement of said actuator, and generates a corresponding output signal;
   an actuator-displacement threshold generator (12) for generating said threshold value for the displacement of said actuator; and a comparator (13) for comparing the integrated output of said integrator with the threshold output from said actuator-displacement threshold generator and generating said comparison output signal representative of the result of the comparison.

3. A cruise control apparatus according to claim 2, further comprising actuator-gain change means (14) for changing a control gain of said actuator based on the output signal from said comparator.

4. A cruise control apparatus according to claim 3, wherein said actuator-gain change means maintains the actuator control gain unchanged if the integrated output of said integrator is less than the threshold value, whereas said actuator gain-change means reduces the actuator control gain if the integrated output of said integrator is equal to or greater than the threshold value.

5. A cruise control apparatus according to claim 2, wherein the output signal from said cruise control instruction means is a throttle opening instruction signal for operating said actuator in a direction to open the throttle valve, or a throttle closing instruction signal for operating said actuator in a direction to close the throttle valve; and said integrator operates such that a previously integrated value of the actuator displacement is added or subtracted by a current actuator displacement output from said cruise controller depending upon whether the cruise control instruction means output is the throttle opening instruction signal or the throttle closing instruction signal, respectively.

* * * * *